United States Patent
Dylewski (10) Patent No.: US 11,333,740 B2
(45) Date of Patent: May 17, 2022

(54) DETERMINING SPECULAR REFLECTIVITY CHARACTERISTICS USING LIDAR

(71) Applicant: UATC, LLC, San Francisco, CA (US)

(72) Inventor: Scott Dylewski, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 683 days.

(21) Appl. No.: 16/114,966

(22) Filed: Aug. 28, 2018

(65) Prior Publication Data

US 2019/0369212 A1 Dec. 5, 2019

Related U.S. Application Data

(60) Provisional application No. 62/680,338, filed on Jun. 4, 2018.

(51) Int. Cl.
*G01C 3/08* (2006.01)
*G01S 7/48* (2006.01)
*G01S 17/93* (2020.01)

(52) U.S. Cl.
CPC ............ *G01S 7/4802* (2013.01); *G01S 17/93* (2013.01)

(58) Field of Classification Search
CPC .............................. G01S 7/4802; G01S 17/93
See application file for complete search history.

(56) References Cited

U.S. PATENT DOCUMENTS

| | | |
|---|---|---|
| 5,202,742 A | 4/1993 | Frank et al. |
| 7,761,236 B2 | 7/2010 | Samukawa et al. |
| 8,346,480 B2 | 1/2013 | Trepagnier et al. |
| 8,941,739 B2 * | 1/2015 | Yoo .................. G01S 17/88 348/148 |
| 9,046,600 B2 | 6/2015 | James |
| 9,453,941 B2 | 9/2016 | Stainvas Olshansky et al. |
| 9,476,705 B2 | 10/2016 | Stroila et al. |
| 9,864,063 B2 | 1/2018 | Gruver et al. |
| 2019/0196020 A1 * | 6/2019 | Aceti ................. G08G 1/04 |

FOREIGN PATENT DOCUMENTS

WO    WO2017053415 A1 * 3/2017 ......... G06K 9/00805

\* cited by examiner

*Primary Examiner* — Mark Hellner
(74) *Attorney, Agent, or Firm* — Dority & Manning, P.A.

(57) ABSTRACT

Aspects of the present disclosure involve systems, methods, and devices for determining specular reflectivity characteristics of objects using a Lidar system of an autonomous vehicle (AV) system. A method includes transmitting at least two light signals directed at a target object utilizing the Lidar system of the AV system. The method further includes determining at least two reflectivity values for the target object based on return signals corresponding to the at least two light signals. The method further includes classifying specular reflectivity characteristics of the target object based on a comparison of the first and second reflectivity value. The method further includes updating a motion plan for the AV system based on the specular reflectivity characteristics of the target object.

20 Claims, 8 Drawing Sheets

DETERMINING SPECULAR REFLECTIVITY CHARACTERISTICS USING LIDAR

CLAIM FOR PRIORITY

This application claims the benefit of priority of U.S. Provisional Application Ser. No. 62/680,338, filed Jun. 4, 2018, which is hereby incorporated by reference in its entirety.

TECHNICAL FIELD

The subject matter disclosed herein relates to light detection and ranging (Lidar) systems. In particular, example embodiments may relate to systems and methods for determining specular reflectivity characteristics of objects using a Lidar system.

BACKGROUND

Lidar is a radar-like system that uses lasers to create three-dimensional representations of surrounding environments. A Lidar unit includes at least one laser emitter paired with a detector to form a channel, though an array of channels may be used to expand the field of view of the Lidar unit. During operation, each channel emits a laser signal into the environment that is reflected off of the surrounding environment back to the detector. A single channel provides a single point of ranging information. Collectively, channels are combined to create a point cloud that corresponds to a three-dimensional representation of the surrounding environment. The Lidar unit also includes circuitry to measure the time of flight (ToF) (i.e., the elapsed time from emitting the laser signal to detecting the return signal). The ToF is used to determine the distance of the Lidar unit to the detected object.

Increasingly, Lidar is finding applications in autonomous vehicle (AV) systems such as partially or fully autonomous cars. Lidar systems for AV systems typically include an array of lasers ("emitters") and an array of detectors, as discussed above. Autonomous vehicles use Lidar for a number of functions, including localization, perception, prediction, and motion planning.

Objects may have reflectivity characteristics that vary based on the direction of reflection. For example, a diffuse object such as a piece of paper reflects light in all directions almost uniformly, whereas a specular object such as a mirror reflects light most strongly in one direction (perpendicular to the surface of the mirror).

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the context of AV systems that rely upon Lidar systems for localization, perception, prediction, and motion planning, specular or diffuse reflectivity characteristics of objects can lead to issues because of both false positives and false negatives in terms of object detection. For example, depending on the specular reflectivity characteristics of an object, the AV systems may, in some instances, not detect an object, while in other instances, the AV system may detect an object that is not actually there. Either instance can be problematic for downstream processing by the localization, perception, prediction, and motion planning systems of the AV system.

Aspects of the present disclosure involve systems, methods, and devices for determining specular reflectivity characteristics of objects using one or more Lidar units. In accordance with some embodiments, a method includes transmitting at least two light signals directed at a target object utilizing a Lidar system of an AV system. The method further includes determining at least two reflectivity values for a target object based on return signals corresponding to the at least two light signals. Each reflectivity value may be determined based on an intensity of the return signal reflected by the target object and a distance travelled by the return light signal. The intensity of the return signal is given by an intensity value included in point data received from the Lidar system. The point data also includes a ToF for each return signal, from which the distance traveled by the return signal may be determined. The method further includes classifying the specular reflectivity characteristics of the target object based on a comparison of the first and second reflectivity value. The classifying of the specular reflectivity characteristics of the target object may including computing a specular reflectivity value that provides a measure of specular reflectivity characteristics of the target object.

Consistent with some embodiments, the determined specular reflectivity characteristics for the target object may be used by a computing system of an AV system in downstream perception, path prediction, and motion planning processes. For example, a motion plan for the AV system may be updated based on the specular reflectivity characteristics. In some instances, state data for the target object may be updated to include an indication of the specular reflectivity characteristics of the target object, and the motion plan is updated in response to the indication of the specular reflectivity characteristics of the target object in the state data. In other instances, map data utilized by the computing system of an AV system may be updated to include the indication of the specular reflectivity characteristics of the target object.

Consistent with some embodiments, the method may include classifying the specular reflectivity characteristic of the target object according to one of multiple levels of specular reflectivity based on the specular reflectivity value. Consistent with these embodiments, indications of the of the specular reflectivity characteristic of the target object included in state data or map data may be or include the specular reflectivity classification of the target object.

Multiple Lidar configurations are contemplated for the Lidar system. For example, in a multiple Lidar unit configuration, point data from a first Lidar unit may be used to derive the first reflectivity value, and point data from a second Lidar unit may be used to derive the second reflectivity value. As another example, in a single Lidar unit configuration, point data from a first channel of a Lidar unit may be used to derive the first reflectivity value, and point data from a second channel of the Lidar unit may be used to derive the second reflectivity value. As yet another example of the single Lidar unit configuration, point data from a channel of a Lidar unit associated with a first timestamp may be used to derive the first reflectivity value, and point data from the same or another channel of the same Lidar unit associated with a second timestamp may be used to derive the second reflectivity value.

Figure 1:
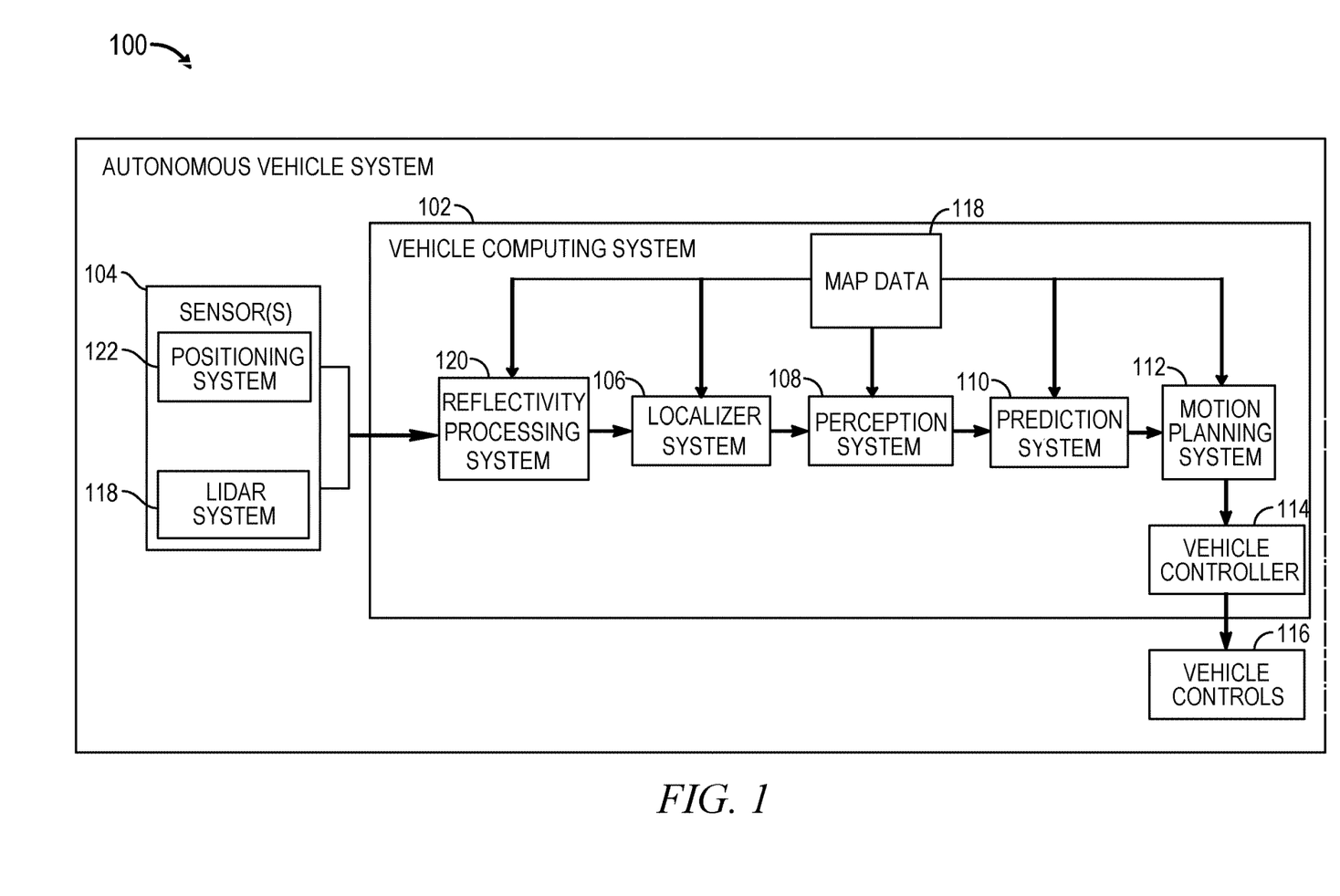
FIG. 1 is a block diagram illustrating an example AV system, according to some embodiments.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the autonomous AV system 100 to facilitate additional functionality that is not specifically described herein.

The autonomous AV system 100 is responsible for controlling a vehicle. The autonomous AV system 100 is capable of sensing its environment and navigating without human input. The autonomous AV system 100 can include a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous AV system 100 includes a vehicle computing system 102, one or more sensors 104, and one or more vehicle controls 116. The vehicle computing system 102 can assist in controlling the autonomous AV system 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 116 to operate the autonomous AV system 100 according to the motion path.

As illustrated in FIG. 1, the vehicle computing system 102 can include one or more computing devices that assist in controlling the autonomous AV system 100. Vehicle computing system 102 can include a localization system 106, a perception system 108, a prediction system 110, a motion planning system 112, and a reflectivity processing system 120 that cooperate to perceive the dynamic surrounding environment of the autonomous AV system 100 and determine a trajectory describing a proposed motion path for the autonomous AV system 100. Vehicle computing system 102 can additionally include a vehicle controller 114 configured to control the one or more vehicle controls 116 (e.g., actuators that control gas flow (propulsion), steering, braking, etc.) to execute the motion of the autonomous AV system 100 to follow the trajectory.

In particular, in some implementations, any one of the localization system 106, the perception system 108, the prediction system 110, the motion planning system 112, or the reflectivity processing system 120 can receive sensor data from the one or more sensors 104 that are coupled to or otherwise included within the autonomous AV system 100. As examples, the one or more sensors 104 can include a Lidar system 118, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous AV system 100.

As one example, for Lidar system 118, the sensor data can include point data that includes the location (e.g., in three-dimensional space relative to the Lidar system 118) of a number of points that correspond to objects that have reflected an emitted laser. For example, Lidar system 118 can measure distances by measuring the ToF that it takes a short laser pulse to travel from the sensor(s) 104 to an object and back, calculating the distance from the known speed of light. The point data further includes an intensity value for each point, which, as described above, can provide information about the reflectiveness of the objects that have reflected an emitted laser. As will be described in further detail below, the intensity return values may be normalized (e.g., by the Lidar system 118 or a component of the vehicle computing system 102) during vehicle operation to be more closely aligned with the reflectivity of the surfaces and objects that have reflected an emitted laser. The normalization of the intensity return values may result in the generation of reflectivity values that provide a measure of reflectivity of the surfaces and objects that have reflected an emitted laser.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera.

Other sensor systems can identify the location of points that correspond to objects as well.

As another example, the one or more sensors 104 can include a positioning system 122. The positioning system 122 can determine a current position of the autonomous AV system 100. The positioning system 122 can be any device or circuitry for analyzing the position of the autonomous AV system 100. For example, the positioning system 122 can determine position by using one or more of inertial sensors; a satellite positioning system, based on Internet Protocol (IP) address, by using triangulation and/or proximity to network access points or other network components (e.g., cellular towers, WiFi access points, etc.); and/or other suitable techniques. The position of the autonomous AV system 100 can be used by various systems of the vehicle computing system 102.

Thus, the one or more sensors 104 can be used to collect sensor data that includes information that describes the location (e.g., in three-dimensional space relative to the autonomous AV system 100) of points that correspond to objects within the surrounding environment of the autonomous AV system 100.

In addition to the sensor data, the perception system 108, prediction system 110, motion planning system 112, and/or the reflectivity processing system 120 can retrieve or otherwise obtain map data 118 that provides detailed information about the surrounding environment of the autonomous AV system 100. The map data 118 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

In addition, according to an aspect of the present disclosure, the map data 118 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The reflectivity processing system 120 receives some or all of the sensor data from sensors 104 and processes the sensor data to determine reflectivity characteristics of objects and surfaces. For example, the reflectivity processing system 120 may analyze reflectivity values based on intensity return values measured by the Lidar system 118 to determine diffuse and specular reflectivity characteristics of objects and surfaces. In analyzing the reflectivity values, the reflectivity processing system 120 computes specular reflectivity values that provide a measure of a specular reflectivity characteristic of an object or surface. Specular reflectivity values at or below a certain threshold (e.g., near zero) may indicate that an object or surface is diffuse while specular reflectivity values above the threshold indicate the object or surface has at least some specular reflectivity characteristics. The reflectivity processing system 120 may further classify the specular reflectivity characteristics of objects and surfaces based on the computed specular reflectivity values. The reflectivity processing system 120 may provide specular reflectivity values and classifications to the perception system 108, the prediction system 110, and the motion planning system 112 for further processing. The reflectivity processing system 120 can also modify or update the map data 118 to include indications of the specular reflectivity characteristics of objects at geographic locations of the corresponding objects.

The localization system 106 receives the map data 118 and some or all of the sensor data from sensors 104 and generates vehicle poses for the AV system 100. A vehicle pose describes the position and attitude of the vehicle. The position of the AV system 100 is a point in a three-dimensional space. In some examples, the position is described by values for a set of Cartesian coordinates, although any other suitable coordinate system may be used. The attitude of the AV system 100 generally describes the way in which the AV system 100 is oriented at its position. In some examples, attitude is described by a yaw about the vertical axis, a pitch about a first horizontal axis, and a roll about a second horizontal axis. In some examples, the localization system 106 generates vehicle poses periodically (e.g., every second, every half second, etc.) The localization system 106 appends time stamps to vehicle poses, where the time stamp for a pose indicates the point in time that is described by the pose. The localization system 106 generates vehicle poses by comparing sensor data (e.g., remote sensor data) to map data 118 describing the surrounding environment of the AV system 100.

In some examples, the localization system 106 includes one or more localizers and a pose filter. Localizers generate pose estimates by comparing remote sensor data (e.g., Lidar, RADAR, etc.) to map data 118. The pose filter receives pose estimates from the one or more localizers as well as other sensor data such as, for example, motion sensor data from an IMU, encoder, odometer, and the like. In some examples, the pose filter executes a Kalman filter or other machine learning algorithm to combine pose estimates from the one or more localizers with motion sensor data to generate vehicle poses.

The perception system 108 can identify one or more objects that are proximate to the autonomous AV system 100 based on sensor data received from the one or more sensors 104 and/or the map data 118. In particular, in some implementations, the perception system 108 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; specular or diffuse reflectivity characteristics; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the autonomous AV system 100 over time. In some instances, the perception system 108 updates state data for an object based on a specular reflectivity value of the object computed the reflectivity processing system 120.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the autonomous AV system 100 based at least in part on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the autonomous AV system 100 that best navigates the autonomous AV system 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.) Nonetheless, the vehicle controller 114 can function to keep the autonomous AV system 100 reasonably close to the motion plan.

More particularly, the vehicle controller 114 can be configured to control motion of the autonomous AV system 100 to follow the motion plan. The vehicle controller 114 can control one or more of propulsion and braking of the autonomous AV system 100 to follow the motion plan. The vehicle controller 114 can also control steering of the autonomous AV system 100 to follow the motion plan. In some implementations, the vehicle controller 114 can be configured to generate one or more vehicle actuator commands and to further control one or more vehicle actuators provided within vehicle controls 116 in accordance with the vehicle actuator command(s). Vehicle actuators within vehicle controls 116 can include, for example, a steering actuator, a braking actuator, and/or a propulsion actuator.

Each of the localization system 106, the perception system 108, the prediction system 110, the motion planning system 112, the reflectivity processing system 120, and the vehicle controller 114 can include computer logic utilized to provide desired functionality. In some implementations, each of the localization system 106, the perception system 108, the prediction system 110, the motion planning system 112, the reflectivity processing system 120, and the vehicle controller 114 can be implemented in hardware, firmware, and/or software controlling a general-purpose processor. For example, in some implementations, each of the localization system 106, the perception system 108, the prediction system 110, the motion planning system 112, the reflectivity processing system 120 and the vehicle controller 114 includes program files stored on a storage device, loaded into a memory and executed by one or more processors. In other implementations, each of the localization system 106, the perception system 108, the prediction system 110, the motion planning system 112, the reflectivity processing system 120, and the vehicle controller 114 includes one or more sets of computer-executable instructions that are stored in a tangible computer-readable storage medium such as RAM, hard disk, or optical or magnetic media.

Figure 2:
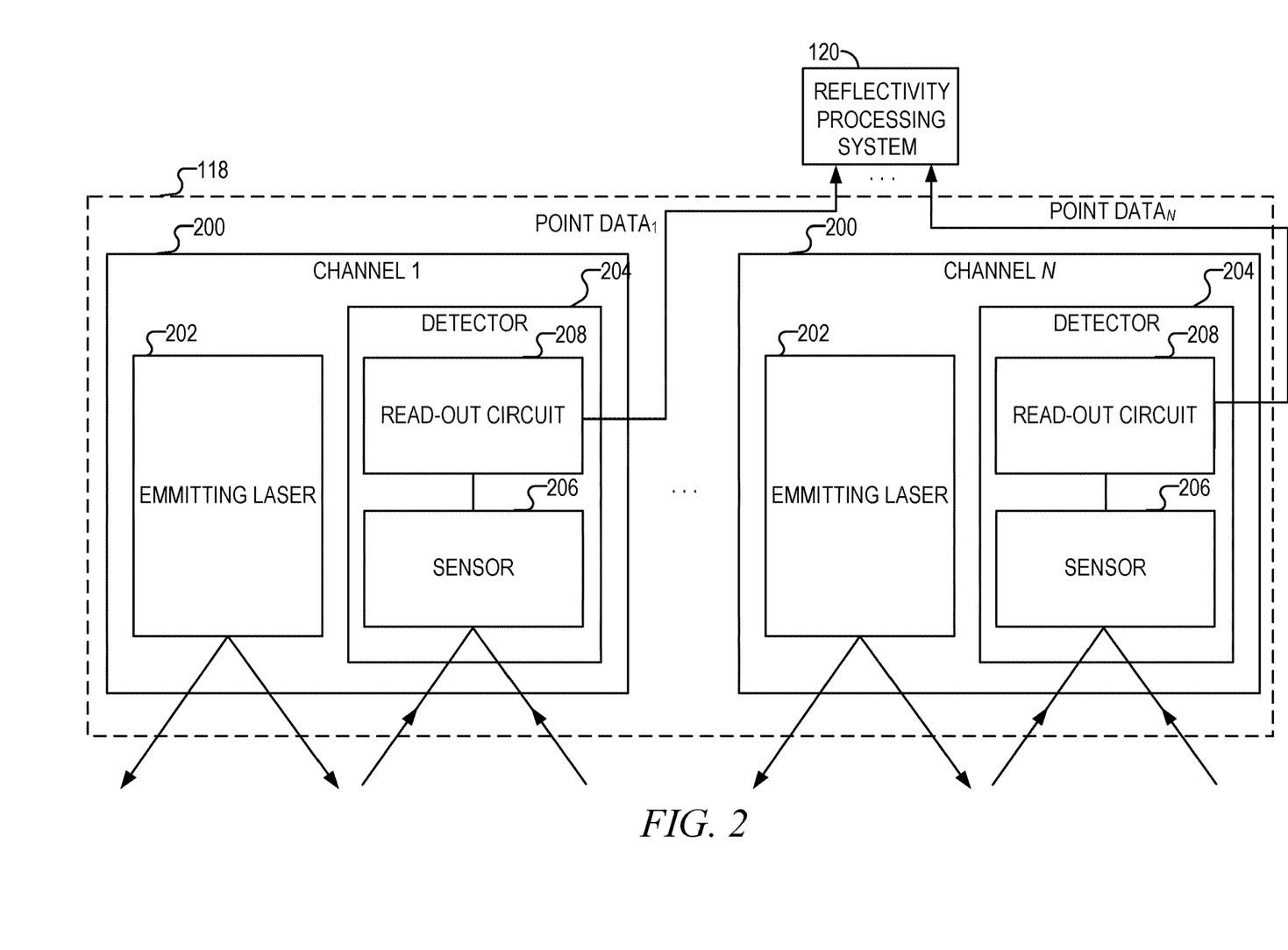
FIG. 2 is block diagram illustrating a Lidar unit, which may be included as part of the AV system illustrated in FIG. 1, according to some embodiments.

FIG. 2 is block diagram illustrating the Lidar system 118, which may be included as part of the autonomous AV system 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar system 118 to facilitate additional functionality that is not specifically described herein.

As shown, the Lidar system 118 comprises multiple channels 200; specifically, channels 1-N are illustrated. The Lidar system 118 may include one or more Lidar units. Thus, the channels 1-N may be included in a single Lidar unit or may be spread across multiple Lidar units.

Each channel 200 outputs point data that provides a single point of ranging information. Collectively, the point data output by each of the channels 200 (i.e., point data$_{1-N}$) is combined to create a point cloud that corresponds to a three-dimensional representation of the surrounding environment.

Each channel 200 comprises an emitter 202 paired with a detector 204. The emitter 202 emits a laser signal into the environment that is reflected off the surrounding environment and returned back to a sensor 206 (e.g., an optical detector) in the detector 204. Each emitter 202 may have an adjustable power level that controls an intensity of the emitted laser signal. The adjustable power level allows the emitter 202 to be capable of emitting the laser signal at one of multiple different power levels (e.g., intensities).

The sensor 206 provides the return signal to a read-out circuit 208 and the read-out circuit 208, in turn, outputs the point data based on the return signal. The point data comprises a distance of the Lidar system 118 from a detected surface (e.g., a road) that is determined by the read-out circuit 208 by measuring the ToF, which is the time elapsed time between the emitter 202 emitting the laser signal and the detector 204 detecting the return signal.

The point data further includes an intensity value corresponding to each return signal. The intensity value indicates a measure of intensity of the return signal determined by the read-out circuit 208. As noted above, the intensity of the return signal provides information about the surface reflecting the signal and can be used by any one of the localization system 106, perception system 108, prediction system 110, and motion planning system 112 for localization, perception, prediction, and motion planning. The intensity of the return signals depends on a number of factors, such as the distance of the Lidar system 118 to the detected surface, the angle of incidence at which the emitter 202 emits the laser signal, temperature of the surrounding environment, the alignment of the emitter 202 and the detector 204, and the reflectivity of the detected surface.

As shown, the reflectivity processing system 120 receives the point data from the Lidar system 118 and processes the point data to classify specular reflectivity characteristics of objects. The reflectivity processing system 120 classifies the specular reflectivity characteristics of objects based on a comparison of reflectivity values derived from intensity values of return signals. In some embodiments, the Lidar system 118 can be calibrated to produce the reflectivity values. For example, the read-out circuit 208 or another component of the Lidar system 118 may be configured to normalize the intensity values to produce the reflectivity values. In these embodiments, the reflectivity values may be included in the point data received by the reflectivity processing system 120 from the Lidar system 118. In other embodiments, the reflectivity processing system 120 may generate the reflectivity values based on intensity return values included in the point data received from the Lidar system 118.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the Lidar system 118 at each power level. The linear model assumes a uniform diffuse reflectivity for all surfaces and describes an expected intensity value as a function of a raw intensity variable, a calibration multiplier variable, and a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel at each power level is assigned to the corresponding channel/power level combination. In this way, each power level of each channel of the Lidar system 118 has an independently assigned calibration multiplier and bias value from which reflectivity values may be derived. Once assigned, the calibration multiplier and bias value of each channel/power level combination are used at run-time to determine reflectivity values from subsequent intensity values produced by the corresponding channel at the corresponding power level during operation of an autonomous or semi-autonomous vehicle. More specifically, reflectivity values are determined from the linear model by using the value of the calibration multiplier and the bias value for the calibration multiplier variable and bias variable, respectively. In this manner, the intensity values are normalized to be more aligned with the reflectivity of a surface by taking into account factors such as the distance of the Lidar system 118 to the detected surface, the angle of incidence at which the emitter 202 emits the laser signal, temperature of the surrounding environment, and the alignment of the emitter 202 and the detector 204.

Figure 3:
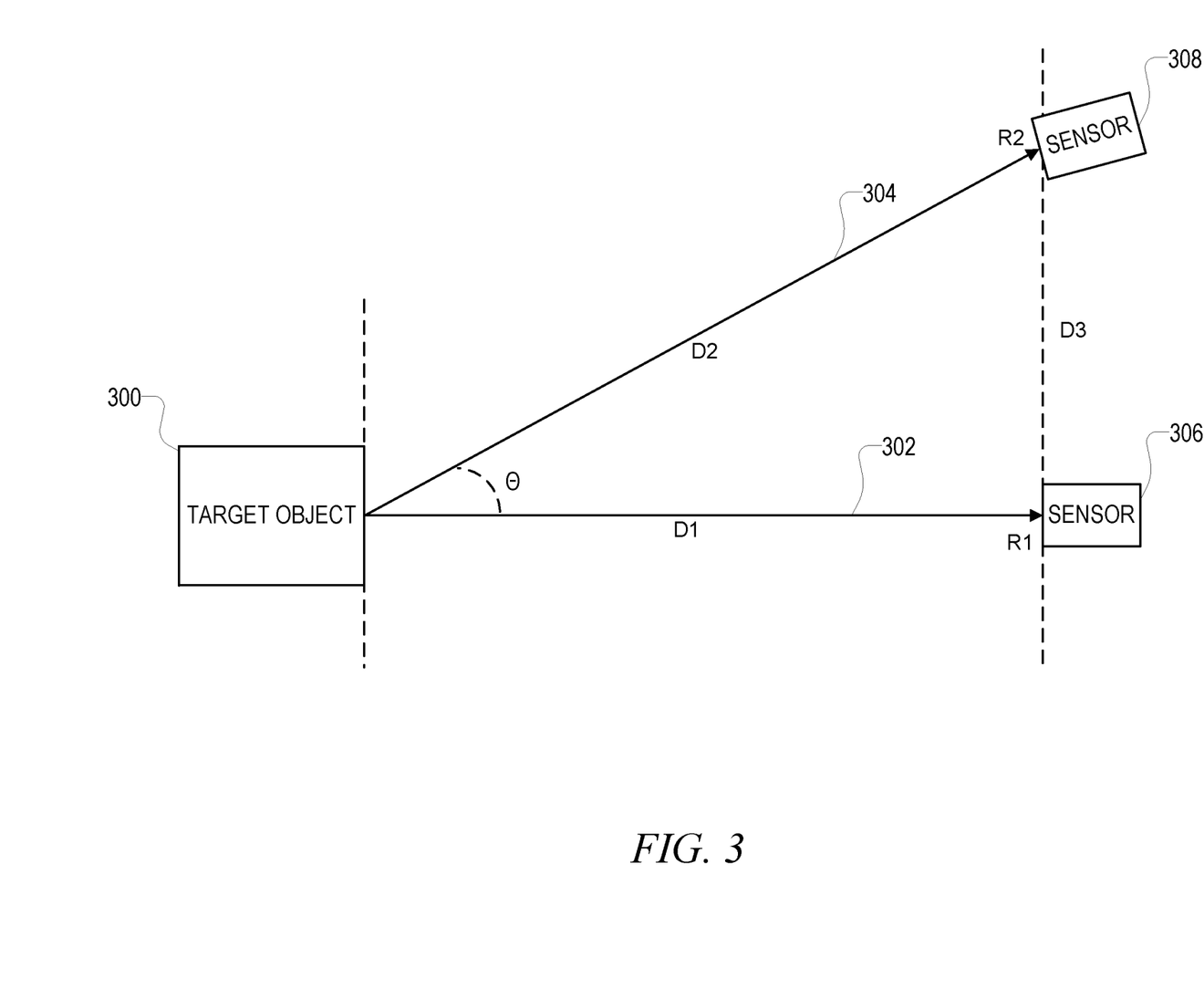
FIG. 3 is a conceptual diagram illustrating a high-level overview of a process performed as part of determining specular reflectivity characteristics of objects, according to some embodiments.

FIG. 3 is a conceptual diagram illustrating a high-level overview of a process performed as part of determining specular reflectivity characteristics of objects, according to some embodiments. In the context of FIG. 3, one or more emitting lasers (e.g., an emitter 202) may transmit two light signals directed at a target object 300. The two light signals are reflected back by the target object 300 and return signals 302 and 304 are received at sensors 306 and 308, respectively. The return signal 302 is produced as a result of the first light signal being reflected by the target object 300 and return signal 304 is produced as a result of the second light signal being reflected by the target object 300.

The return signal 302 has a reflectivity value of R1 and the return signal 304 has a reflectivity value of R2. Each of the reflectivity values indicate reflectivity characteristics of the target object 300.

The sensors 306 and 308 can be any optical detector capable of detecting light, such as a sensor 206 of the Lidar system 118. Depending on the embodiment, the sensors 306 and 308 may correspond to sensors 206 included in different Lidar units, sensors 206 included in different channels of the same Lidar unit, or the sensors 306 and 308 may each correspond to the same sensor 206 within the same Lidar unit. For example, in one embodiment, the sensor 306 corresponds to a sensor 206 of a first Lidar unit and the sensor 308 corresponds to a sensor 206 of a second Lidar unit. In another embodiment, the sensor 306 corresponds to a sensor 206 of a first channel of a Lidar unit and the sensor 308 corresponds to a sensor 206 of a second channel of the Lidar unit. In yet another embodiment, both the sensors 306 and 308 correspond to the same sensor 206 of a Lidar unit, and the return signals 302 and 304 may be received at different times.

In some embodiments, the sensors 306 and 308 can be calibrated to measure the reflectivity values of return signals 302 and 304, respectively. In these embodiments, the reflectivity values R1 and R2 may be included in point data produced by the Lidar system 118. In other embodiments, one or more components in communication (e.g., the reflectivity processing system 120 or a read-out circuit 208) with the sensors 306 and 308 may determine the reflectivity values based on a combination of factors such as the distance traveled by the return signals 302 and 304 (shown as D1 and D2, respectively), an intensity of the emitted light signals (e.g., determined by a power level of a corresponding emitter 202), an angle of incidence at which the light signals are emitted, and an intensity of the return signals 302 and 304, among others.

The reflectivity processing system 120 may compare the reflectivity values R1 and R2 to determine a specular reflectivity value that describes specular reflectivity characteristics of the target object 300. For example, the reflectivity processing system 120 may determine the specular reflectivity value using the following formula:

$$\text{Specular reflectivity value} = (2|R1 - R2|)/(R1 + R2)$$

If the target object 300 has at least some level of specular reflectivity, it is expected that the reflectivity values R1 and R2 will be different assuming that the angles of incidence between the two return signals 302 and 304 are sufficiently different. Thus, according to above formula, if the first and second reflectivity values are the same, the specular reflectivity of the target object is zero and thus, the target object 300 is diffuse. Otherwise, the specular reflectivity value describes a level of specular reflectivity of the target object 300. More specifically, a higher specular reflectivity value describes a higher level of specular reflectivity for the target object 300. It shall be appreciated that the formula referenced above is merely an example of how the specular reflectivity value may be determined according to some embodiments, and in other embodiments, other formulas, algorithms or techniques may be employed.

As noted above, the formula used for computing the specular reflectivity value assumes that the angles of incidence between the two return signals 302 and 304 are sufficiently different. That is, the formula assumes that the angular difference, θ, between the return signals 302 and 304 is above a threshold angular difference (e.g., 0°). Accordingly, prior to computing the specular reflectivity value, the reflectivity processing system 120 may verify that the angular difference, θ, between the return signals 302 and 304 is above the threshold angular difference (e.g., 0°).

In some embodiments, the reflectivity processing system 120 may determine the angular difference, θ, based, in part, on the distances, D1, D2, and D3. For example, the distances D1 and D2 may be determined based on respective ToF values of the return signals 302 and 304 measured by the sensors 306 and 308 along with the known speed of light. In embodiments in which the return signals 302 and 304 are received by different sensors (e.g., sensors in different channels of the same Lidar unit or sensors in different Lidar units), an offset distance, D3, between the sensors 306 and 308 is a fixed known distance. In embodiments in which sensors 306 and 308 correspond to the same sensor 206 of the same Lidar unit, the reflectivity processing system 120 may utilize the distances D1 and D2 to determine the distance D3. The reflectivity processing system 120 may further utilize data produced by other components of the vehicle computing system 102 such as map data 118, vehicle poses, object state data, predicted object trajectories predicted, and/or motion plans to determine additional information needed to determine the angular difference, θ. For example, the reflectivity processing system 120 may use such data to determine an angle of incidence of one or more of the return signals 302 and 304.

Additionally, prior to computing the specular reflectivity value, the reflectivity processing system 120 may verify that the reflectivity values R1 and R2 both correspond to the target object 300. That is, the reflectivity processing system 120 may confirm that both return signals 302 and 304 are produced as a result of light signals reflected by the target object 300 rather than by multiple objects. The reflectivity processing system 120 may utilize data produced by other components of the vehicle computing system 102 to perform this verification. For example, the reflectivity processing system 120 may analyze point data produced by the Lidar system 118, map data 118, vehicle poses generated by the localization system 106, object state data generated by the perception system 108, object trajectories predicted by the prediction system, and/or motion plans generated by the motion prediction system 110 in light of the distances D1 and D2 between the sensors 306 and 308 and the target object 300 (e.g., determined based on the ToF of the return signals 302 and 304) to verify that the reflectivity values R1 and R2 both correspond to the target object 300.

Figure 4:
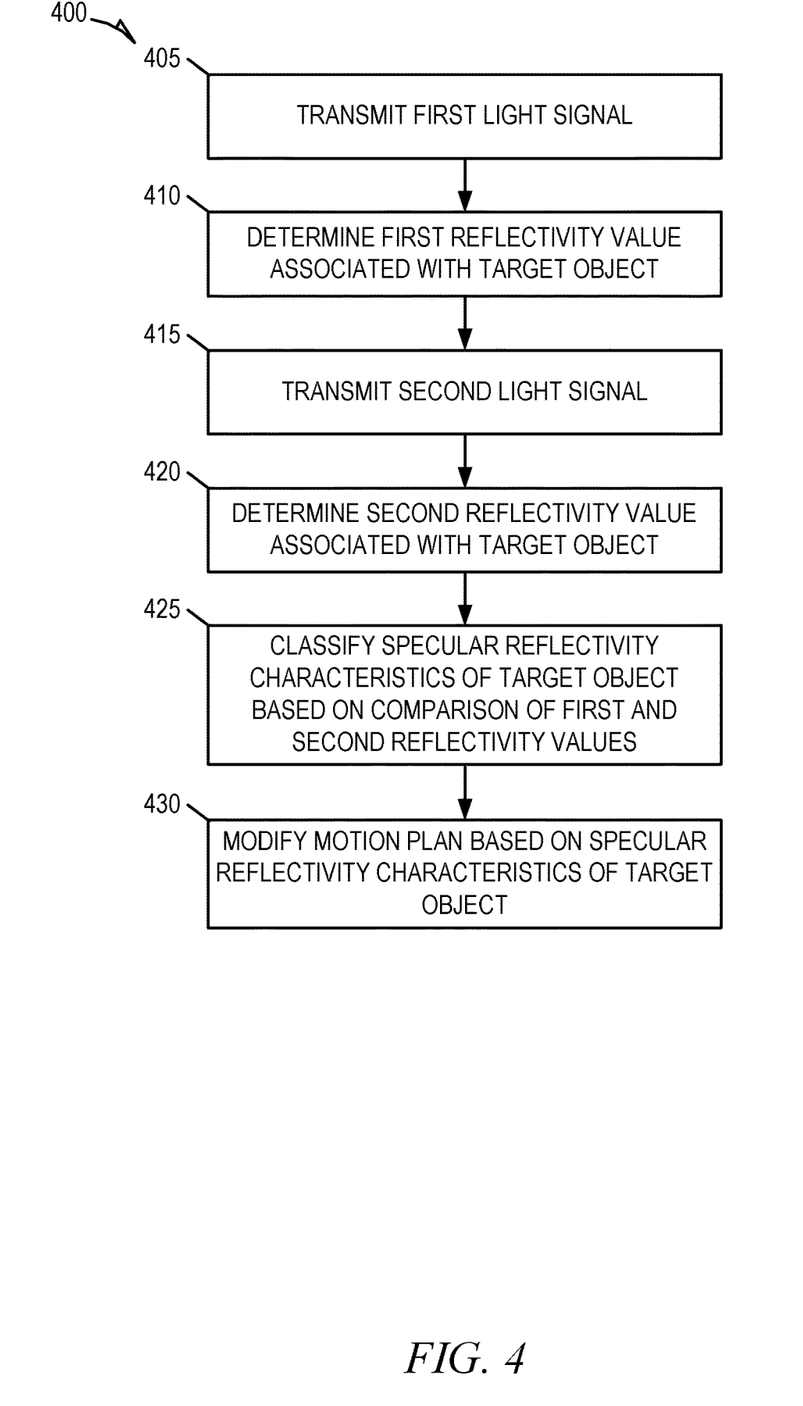
FIGS. 4 and 5 are flowcharts illustrating example operations of the AV system in performing a method for updating a motion plan of the AV system based on determined specular reflectivity characteristics of objects, according to some embodiments.
Figure 5:
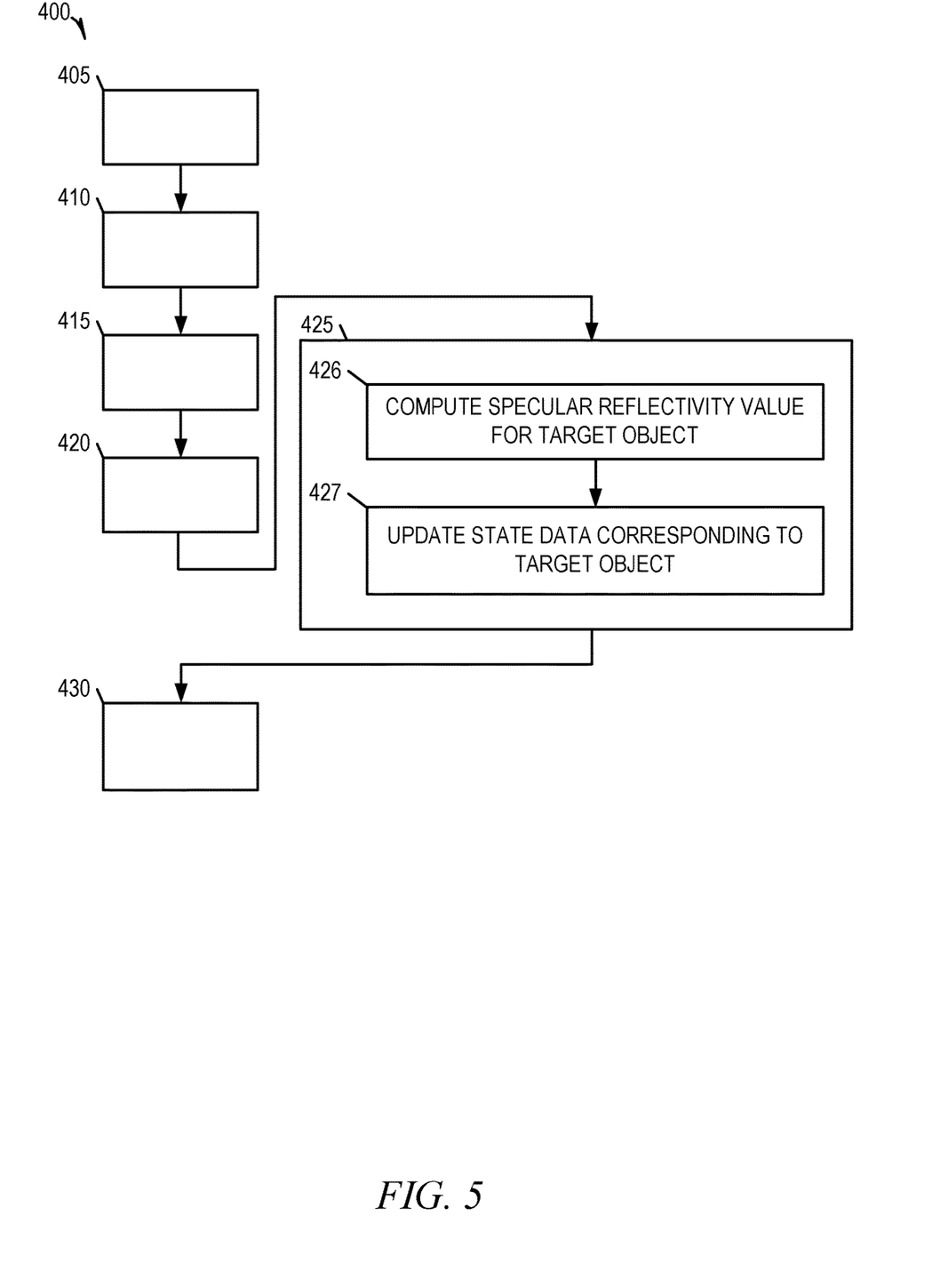

FIGS. 4 and 5 are flowcharts illustrating example operations of the AV system in performing a method 400 for updating a motion plan of the AV system based on determined specular reflectivity characteristics of objects, according to some embodiments. The method 400 may be embodied in computer-readable instructions for execution by a hardware component (e.g., a processor) such that the operations of the method 400 may be performed by one or more components of the AV system 100. Accordingly, the method 400 is described below, by way of example with reference thereto. However, it shall be appreciated that the method 400 may be deployed on various other hardware configurations and is not intended to be limited to deployment on the vehicle computing system 102.

At operation 405, the Lidar system 118 transmits a first light signal directed at a target object. At operation 410, the reflectivity processing system 120 determines a first reflectivity value associated with the target object based on a first return signal received at the Lidar system 118 after transmitting the first light signal. The first return signal results from the first light signal being reflected back to the Lidar system 118 by the target object. The first reflectivity value includes a first measure of the reflectivity of the target object.

At operation 415, the Lidar system 118 transmits a second light signal directed at the target object. At operation 420, the reflectivity processing system 120 determines a second reflectivity value associated with the target object based on a second return signal received at the Lidar system 118 after transmitting the second light signal. The second return signal results from the second light signal being reflected back to the Lidar system 118 by the target object. The second reflectivity value includes a second measure of the reflectivity of the target object.

The reflectivity processing system 120 may access point data obtained from the Lidar system 118 to determine the first and second reflectivity values. For example, as noted above, in some embodiments, the Lidar system 118 may be calibrated to produce reflectivity values and incorporate them into point data, and the reflectivity processing system 120 may determine the first and second reflectivity values from the point data. In other embodiments, the reflectivity processing system 120 may access point data obtained from the Lidar system 118 to determine the first and second intensity values, from which the reflectivity processing system may derive the first and second reflectivity values.

In some embodiments, a first channel of a Lidar unit can transmit the first light signal and receive the first return signal while a second channel of a Lidar unit can transmit the second light signal and receive the second return signal. Depending on the embodiment, the first and second channel may correspond to the same Lidar unit or the first and second channel may correspond to different Lidar units. For example, in embodiments in which the Lidar system 118 includes multiple Lidar units, the first light signal can be transmitted by a first Lidar unit and the first return signal can be received by the first Lidar unit. In this example, the second light signal can be transmitted by a second lidar unit and the second return signal can be received by the second Lidar unit. In other embodiments, the first and second light signals can be transmitted at different times by the same channel of the same Lidar unit, and the first and second return signals are received by the same channel of the same Lidar unit, albeit at different times.

At operation 425, the reflectivity processing system 120 classifies the specular reflectivity characteristics of the target object based on a comparison of the first and second reflectivity values. The reflectivity processing system 120 may classify the specular reflectivity characteristics of the target object according to one of multiple levels of specular reflectivity. In some embodiments, the specular reflectivity characteristics of the target object may be classified using a quantitative indication of specularity (e.g., a number between 0 and 1). In some embodiments, the specular reflectivity characteristics of the target object may be classified in a binary manner simply as either diffuse or specular. In other embodiments, the specular reflectivity characteristics of the target object may be classified according to more granular specular reflectivity classifications such as, for example: diffuse, partially specular, mostly specular, and completely specular.

As will be discussed further below, the classifying of the specular reflectivity characteristics of the target object may include computing a specular reflectivity value for the target object. The reflectivity processing system 120 may compare the specular reflectivity value to one or more threshold values to classify the specular reflectivity characteristics of the target object. Each threshold value corresponds to a level of specular reflectivity. For example, in embodiments in which the specular reflectivity characteristics of the target object may be classified in a binary manner, the reflectivity processing system 120 may classify the target object as being specular if the specular reflectivity value is above a threshold (e.g., zero). In this example, the reflectivity processing system 120 may classify the target object as being diffuse if the specular reflectivity value is not above the threshold.

As another example, in embodiments in which the reflectivity processing system 120 classifies the specular reflectivity characteristics of the target object according to more granular specular reflectivity classifications, the reflectivity processing system 120 may classify the target object as: partially specular based on the specular reflectivity value exceeding a first threshold; mostly specular based on the specular reflectivity value exceeding a second threshold; completely specular based on the specular reflectivity value exceeding a third threshold; or diffuse based on the specular reflectivity value not exceeding any of the first, second, or third thresholds.

At operation 430, the motion planning system 112 updates a motion plan for the AV system 100 based on the specular reflectivity classification of the target object. In an example, the specular reflectivity classification of the target object may cause the motion planning system 112 to update the motion plan for the AV system 100 to avoid the target object where the motion plan would have otherwise caused the AV system 100 to collide with the object. In another example, the specular reflectivity classification of the target object may cause the motion planning system 112 to update the motion plan for the AV system 100 to pass over the target object where the motion plan would have otherwise caused the AV system 100 to proceed on a path that would have unnecessarily avoided the target object.

As shown in FIG. 5, the method 400 may, in some embodiments, further include operations 426 and 427. Consistent with some embodiments, the operations 426 and 427 may be performed prior to (e.g., as precursor tasks), or as part of (e.g., subroutines), operation 425, where the reflectivity processing system 120 classifies the specular reflectivity characteristics of the target object.

At operation 426, the reflectivity processing system 120 computes a specular reflectivity value corresponding to the target object based on a comparison of the first reflectivity value and the second reflectivity value. The specular reflectivity value indicates specular reflectivity characteristics of the target object. As noted above, the reflectivity processing system 120 may, for example, compute the specular reflectivity value according to the following formula:

$$\text{Specular reflectivity value} = (2|R1-R2|)/(R1+R2)$$

where R1 is the first reflectivity value and R2 is the second reflectivity value. According to this formula, if the first and second reflectivity values are the same, the specular reflectivity of the target object is zero and thus, the target object is diffuse. As noted above, the above referenced formula is merely an example of how the specular reflectivity value is determined according to some embodiments, and in other embodiments, other formulas, algorithms, or techniques may be used for determining the specular reflectivity value.

At operation 427, the reflectivity processing system 120 updates state data corresponding to the target object to include an indication of the specular reflectivity characteristics of the target object. The reflectivity processing system 120 may, for example, update the state data to include an indication of the specular reflectivity value of the target object, the specular reflectivity classification of the target object, or a combination of both.

Figure 6:
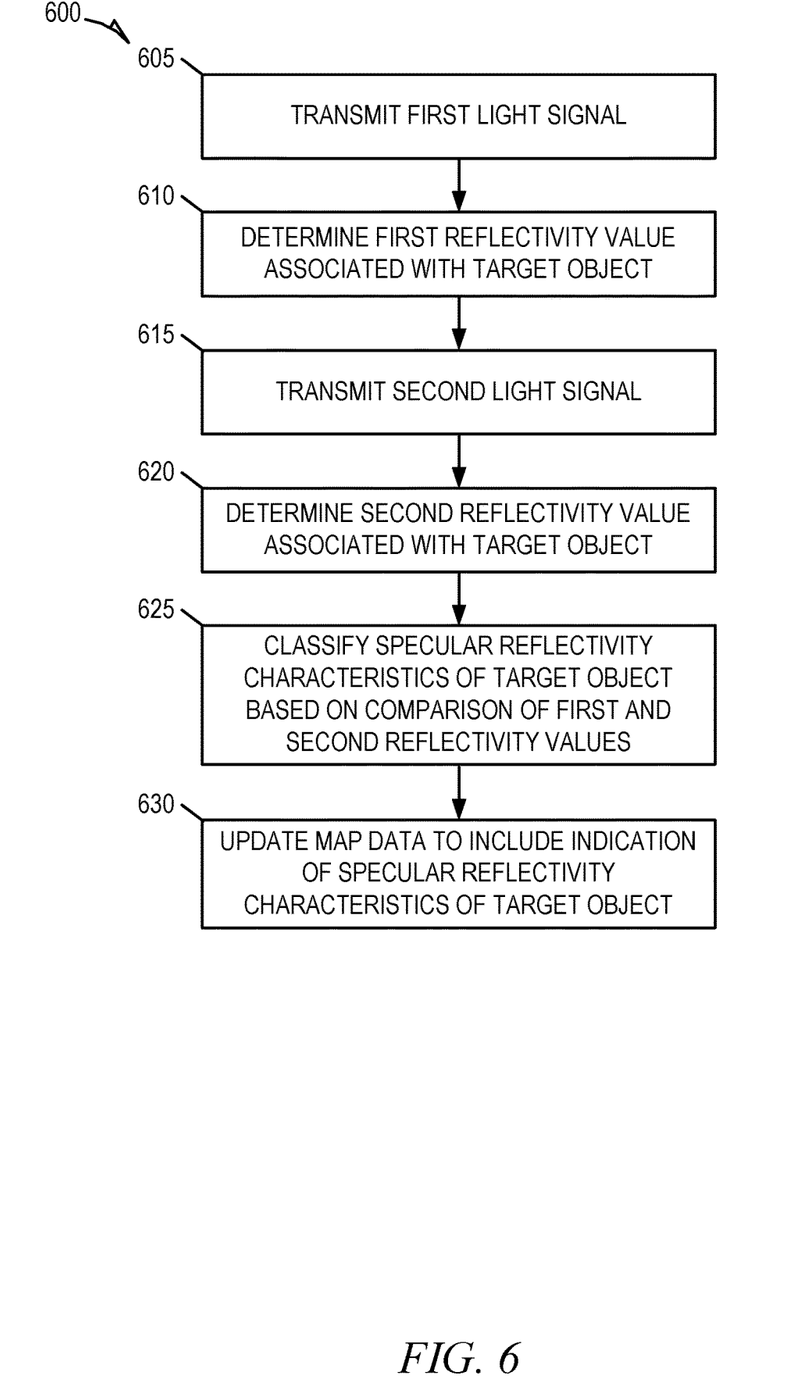
FIG. 6 is a flowchart illustrating example operations of the AV system in performing a method for updating map data based on determined specular reflectivity characteristics of objects, according to some embodiments.

FIG. 6 is a flowchart illustrating example operations of the AV system 100 in performing a method 600 for updating map data based on determined specular reflectivity characteristics of a target object, according to some embodiments. The method 600 may, in some embodiments, be performed subsequent to the method 400. The method 600 may be embodied in computer-readable instructions for execution by a hardware component (e.g., a processor) such that the operations of the method 600 may be performed by one or more components of the AV system 100. Accordingly, the method 600 is described below, by way of example with reference thereto. However, it shall be appreciated that the method 600 may be deployed on various other hardware configurations and is not intended to be limited to deployment on the vehicle computing system 102.

At operation 605, the Lidar system 118 transmits a first light signal directed at a target object. At operation 610, the reflectivity processing system 120 determines a first reflectivity value associated with the target object based on a first return signal received at the Lidar system 118 after transmitting the first light signal. The first return signal results from the first light signal being reflected back to the Lidar system 118 by the target object. The first reflectivity value includes a first measure of the reflectivity of the target object.

At operation 615, the Lidar system 118 transmits a second light signal directed at the target object. At operation 620, the reflectivity processing system 120 determines a second reflectivity value associated with the target object based on a second return signal received at the Lidar system 118 after transmitting the second light signal. The second return signal results from the second light signal being reflected back to the Lidar system 118 by the target object. The second reflectivity value includes a second measure of the reflectivity of the target object.

The reflectivity processing system 120 may access point data obtained from the Lidar system 118 to determine the first and second reflectivity values. For example, as noted above, in some embodiments, the Lidar system 118 may be calibrated to produce reflectivity values and incorporate them into point data, and the reflectivity processing system 120 may determine the first and second reflectivity values from the point data. In other embodiments, the reflectivity processing system 120 may access point data obtained from the Lidar system 118 to determine the first and second intensity values, from which the reflectivity processing system may derive the first and second reflectivity values.

At operation 625, the reflectivity processing system 120 classifies the specular reflectivity characteristics of the target object based on a comparison of the first and second reflectivity values. The reflectivity processing system 120 may classify the specular reflectivity characteristics of the target object in the same manner as described above with reference to FIGS. 4 and 5.

At operation 630, the reflectivity processing system 120 updates the map data 118 to include an indication of the specular reflectivity characteristics of the target object. In particular, the reflectivity processing system 120 may update the map data 118 to include an indication of the specular reflectivity classification of the target object, a specular reflectivity value of the target object or a combination of both at a geographic location of the target object. The indication of the specular reflectivity classification of the target object included in the map data 118 may provide a basis for a subsequent AV system to modify a motion plan.

Figure 7:
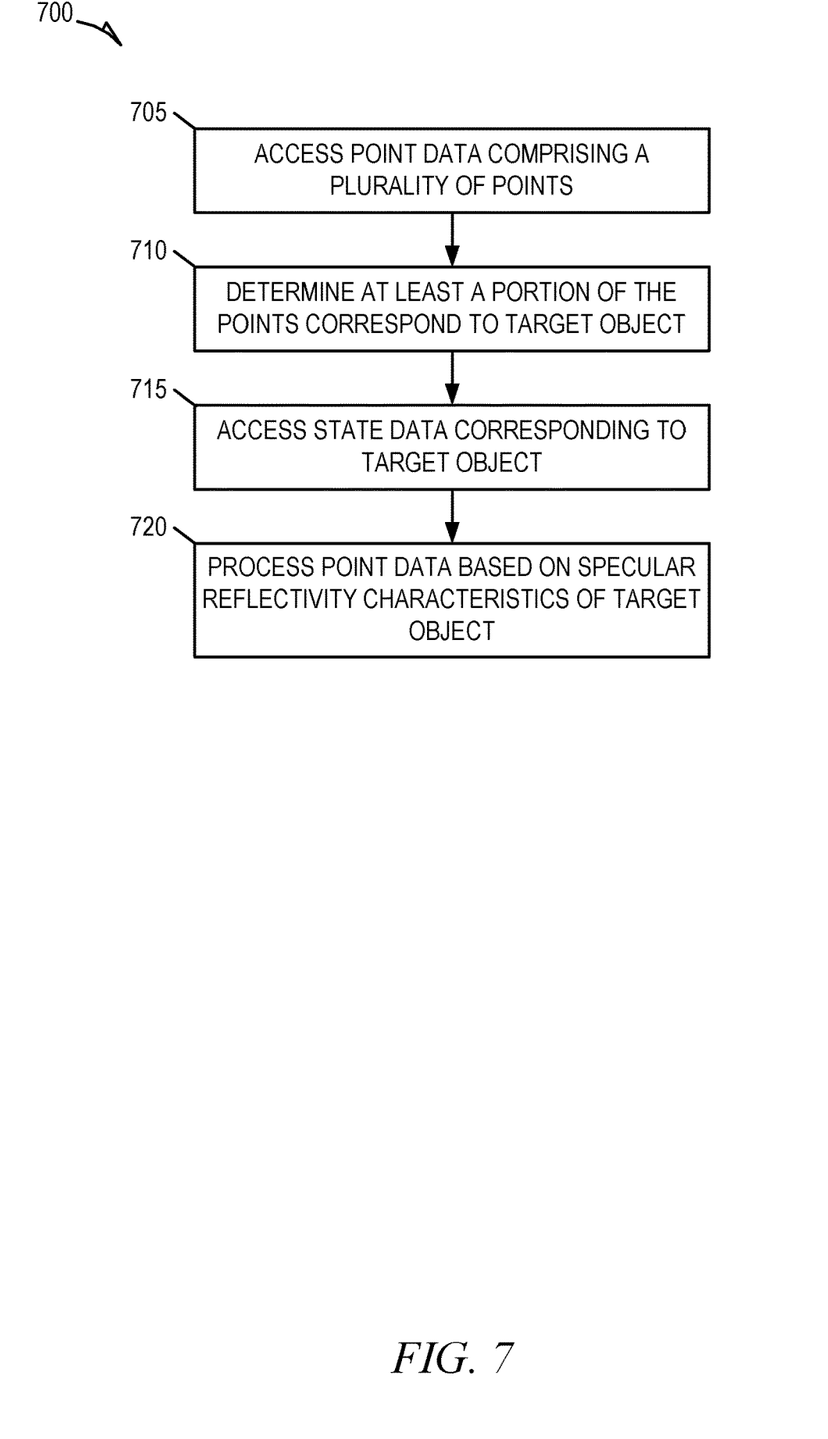
FIG. 7 is a flowchart illustrating example operations of the AV system in performing a method for processing point data based on determined specular reflectivity characteristics of a target object, according to some embodiments.

FIG. 7 is a flowchart illustrating example operations of the AV system 100 in performing a method 700 for processing point data based on determined specular reflectivity characteristics of a target object, according to some embodiments. The method 700 may, in some embodiments, be performed subsequent to any one of the methods 400 and 600. The method 700 may be embodied in computer-readable instructions for execution by a hardware component (e.g., a processor) such that the operations of the method 700 may be performed by one or more components of the AV system 100. Accordingly, the method 700 is described below, by way of example with reference thereto. However, it shall be appreciated that the method 700 may be deployed on various other hardware configurations and is not intended to be limited to deployment on the vehicle computing system 102.

At operation 705, a component of the vehicle computing system 102 (e.g., the localization system 106, the perception system 108, or the prediction system 110) accesses point data produced by the Lidar system 118 comprising a plurality of points. At operation 710, the component of the vehicle computing system 102 determines at least a portion of the plurality of points corresponds to the target object. For example, the localization system 106 or the perception system 108 may utilize the map data 118 to correlate the location of one or more points in the point data to the known or predicted location of the target object.

At operation 715, the component of the vehicle computing system 102 accesses state data for the target object in response to determining that at least a portion of the plurality of points correspond to the target object. As noted above, the state data includes an indication of the specular reflectivity characteristics of the target object such as a specular reflectivity score and/or a specular reflectivity characterization. At operation 720, the component of the vehicle computing system 102 processes the point data based on the indication of the specular reflectivity characteristics of the target object. For example, the component of the vehicle computing system 102 may filter out or otherwise ignore the portion of the plurality of points that correspond to the target object.

Figure 8:
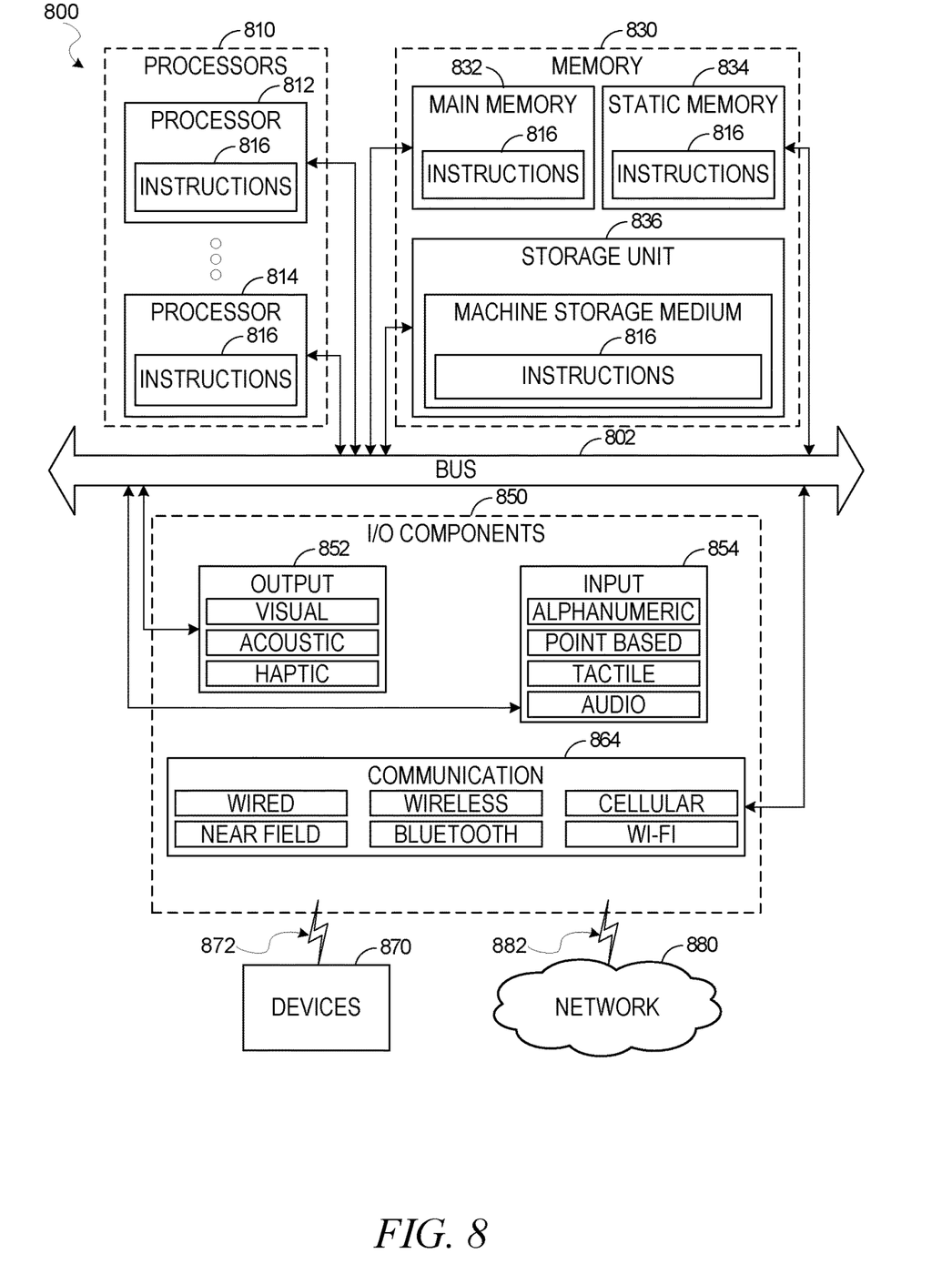
FIG. 8 is a diagrammatic representation of a machine in the example form of a computer system within which a set of instructions for causing the machine to perform any one or more of the methodologies discussed herein may be executed.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods 400 and 600. In this way, the instructions 816 transform a general, non-programmed machine into a particular machine 800, such as the vehicle computing system 102, that is specially configured to carry out the described and illustrated functions in the manner described here. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, both accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)).

Executable Instructions and Machine Storage Medium

The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An autonomous vehicle (AV) system configured to control a vehicle, the AV system comprising:
   a light detection and ranging (Lidar) system that includes one or more Lidar sensor units, wherein at least one of the one or more Lidar sensor units is configured to:
   transmit a first light signal and a second light signal toward an environment in which the vehicle is located, and
   in response to the first light signal and the second light signal, respectively, receive a first return signal and a second return signal that are reflected by an object in the environment and one or more processors that are configured to:
   determine a first reflectivity value associated with the object based on a first intensity value of the first return signal and a second reflectivity value associated with the object based on a second intensity value of the second return signal
   classify specular reflectivity characteristics of the object based on a comparison of the first reflectivity value and the second reflectivity value; and
   update a motion plan for the vehicle based on the specular reflectivity characteristics of the object, the motion plan of the vehicle being used to control motion of the vehicle.

2. The AV system of claim 1, wherein to classify the specular reflectivity characteristics of the object, the one or more processors are configured to:
   compute a specular reflectivity value corresponding to the object based on the first reflectivity value and the second reflectivity value, the specular reflectivity value indicating a measure of the specular reflectivity characteristics of the object.

3. The AV system of claim 1, wherein to classify the specular reflectivity characteristics of the object, the one or more processors are configured to:
   update state data corresponding to the object to include an indication of the specular reflectivity characteristics of the object.

4. The AV system of claim 3, wherein to classify the specular reflectivity characteristics of the object, the one or more processors are configured to:
   classify the specular reflectivity characteristics of the object according to one of multiple specular reflectivity classifications, wherein the indication of the specular reflectivity characteristics of the object includes an indication of the one of multiple specular reflectivity classifications.

5. The AV system of claim 4, wherein the multiple specular reflectivity classifications include: diffuse and specular.

6. The AV system of claim 4, wherein the one or more processors are configured to classify the specular reflectivity characteristics using a quantitative indication of specularity.

7. The AV system of claim 1, wherein one or more processors are further configured to:
   update map data to include an indication of the specular reflectivity characteristics of the object.

8. The AV system of claim 1, wherein:
   at least one Lidar sensor unit is configured to derive the first reflectivity value from the first intensity value and to derive the second reflectivity value from the second intensity value; and
   the one or more processors are further configured to:
   access first point data produced by the Lidar system, the first point data comprising the first reflectivity value; and
   access second point data produced by the Lidar system, the second point data comprising the second reflectivity value.

9. The AV system of claim 1, wherein:
   the first return signal is received at a first channel of a Lidar sensor unit of the one or more Lidar sensor units of the Lidar system; and
   the second return signal is received at a second channel of the Lidar sensor unit.

10. The AV system of claim 1, wherein:
    the first return signal is received at a Lidar unit of the one or more Lidar sensor units of the Lidar system at a first time; and
    the second return signal is received at the Lidar sensor unit at a second time.

11. The AV system of claim 10, wherein the one or more processors are further configured to:
    verify that the first reflectivity value and the second reflectivity value correspond to the object.

12. The AV system of claim 1, wherein:
    the first return signal is received at a first Lidar sensor unit of the one or more Lidar sensor units of the Lidar system; and the second return signal is received at a second Lidar sensor unit of the one or more Lidar sensor units of the Lidar system.

13. The AV system of claim 1, wherein the one or more processors are further configured to:
   verify that an angular difference between the first reflectivity value and the second reflectivity value exceeds a threshold angular difference.

14. The AV system of claim 1, wherein the one or more processors are further configured to:
   obtain, from a Lidar sensor unit of the one or more Lidar sensor units, point data comprising a plurality of points;
   determine at least a portion of the plurality of points correspond to the object; and
   in response to determining at least a portion of the plurality of points correspond to the object, process the point data based on the specular reflectivity value corresponding to the object.

15. The AV system of claim 14, wherein to process the plurality of points based on the specular reflectivity value, the one or more processors are configured to filter the plurality of points based on the specular reflectivity value corresponding to the object.

16. A method comprising:
   transmitting, by one or more Lidar sensor units of a Lidar system of an autonomous vehicle (AV) system configured to control a vehicle, a first light signal and a second light signal toward an environment in which the vehicle is located;
   in response to transmitting the first light signal and the second light signal, respectively, receiving, by the one or more Lidar sensor units, a first return signal and a second return signal that are reflected by an object in the environment
   determining, by one or more processors of the AV system, a first reflectivity value associated with the object based on a first intensity value of the first return signal and a second reflectivity value associated with the object based on a second intensity value of the second return signal;
   classifying, by the one or more processors, specular reflectivity characteristics of the object based on a comparison of the first reflectivity value and the second reflectivity value; and
   updating, by the one or more processors, a motion plan for the vehicle based on the specular reflectivity characteristics of the object, the motion plan of the vehicle being used to control motion of the vehicle.

17. The method of claim 16, wherein classifying the specular reflectivity characteristics of the object comprises:
   computing, by the one or more processors, a specular reflectivity value corresponding to the object based on the first reflectivity value and the second reflectivity value, the specular reflectivity value indicating a measure of the specular reflectivity characteristics of the object.

18. The method of claim 16, wherein classifying the specular reflectivity characteristics of the object comprises:
   updating, by the one or more processors, state data corresponding to the object, the updating of the state data including modifying, by the one or more processors, the state data to include an indication of the specular reflectivity characteristics of the object, wherein the updating of the motion plan is in response to modifying the state data.

19. The method of claim 18, wherein classifying the specular reflectivity characteristics of the object comprises:
   classifying, by the one or more processors, the specular reflectivity characteristics of the object according to one of multiple specularity classifications based on the specular reflectivity value, wherein the state data is updated to include an indication of the one of multiple specularity classifications.

20. A machine-storage medium storing instructions that, when executed by one or more processors of an autonomous vehicle (AV) system, cause the AV system to perform operations comprising:
   transmitting, by one or more light detection and ranging (Lidar) sensor units of a Lidar system of the AV system, a first light signal and a second light signal toward an environment in which a vehicle is located;
   in response to transmitting the first light signal and the second light signal, receiving, by the one or more LIDAR sensor units, a first return signal and a second return signal that are reflected by an object in the environment;
   determining a first reflectivity value associated with the object based on a first intensity value of the first return signal and a second reflectivity value associated with the object based on a second intensity value of the second return signal;
   classifying specular reflectivity characteristics of the object based on a comparison of the first reflectivity value and the second reflectivity value; and
   updating a motion plan for the vehicle based on the specular reflectivity characteristics of the object, the motion plan of the vehicle being used to control motion of the vehicle.

* * * * *